April 9, 1968

R. E. ELIASON 3,376,775

CUTTING MECHANISM

Filed Jan. 3, 1966

INVENTOR.
RAYMOND E. ELIASON

BY *Robert L. Nathan*

ATTORNEY

United States Patent Office 3,376,775
Patented Apr. 9, 1968

3,376,775
CUTTING MECHANISM
Raymond E. Eliason, Rochester, N.Y., assignor to Itek Corporation, Lexington, Mass., a corporation of Delaware
Filed Jan. 3, 1966, Ser. No. 518,239
5 Claims. (Cl. 83—582)

ABSTRACT OF THE DISCLOSURE

This disclosure illustrates a power driven knife for cutting strip or sheet material. A fixed blade coacts with a movable blade which is driven by a crank drive mechanism. A special linkage mechanism is provided having one portion pivotally mounted to the transport structure and a second portion pivotally mounted to the movable blade in a manner to permit only small variations in the cutting angle during the cutting stroke.

---

This invention relates to cutting mechanisms, and in particular to a cutting mechanism having a cutting cycle for cutting strip material.

The cutting mechanism of the present invention has particular applicability for use in projection printers wherein exposed lengths of photosensitive printed material are severed from the remainder thereof and are passed through a processing unit for developing the latent image on the material and are thereafter discharged to be received by the operator. However, it is to be understood that the cutting mechanism of the present invention could be used with equal facility in other types of apparatus where it is desired to cut off a length of sheet or strip material.

While a great number of cutting mechanisms have been devised, many have involved complicated structural elements that are expensive to manufacture and are not completely reliable in use; many prior art cutters employ a movable blade pivoted at one end and coacting with a fixed blade. As cutting proceeds, cutting velocity increases since the cutting angle decreases. Also, the applied cutting force becomes sharply reduced since the lever arm distance between the applied force and the pivot point is increasing. Under certain circumstances, this reduction in cutting force causes a ragged cut. Also, power drain sharply increases, since the cutting velocity is increasing, particularly if a large number of sheets are being cut. This is undesirable since a flywheel may be needed for certain applications. It is, therefore, desirable to maintain the cutting angle constant and to apply the driving force primarily at a central portion of the blade. Additionally, the use of a short stroke crank driving mechanism is advantageous since space and metal may be saved and cycling rates may be increased.

The cutting mechanism of the present invention overcomes the foregoing drawbacks of the prior art. In accordance with the present invention, a crank drive mechanism and a linkage mechanism rotate and drive a first cutting blade relative to a second cutting blade in a manner to maintain the cutting edges at a constant angle. Moreover, the crankshaft drive mechanism drives the first cutting blade at a central portion thereof to minimize the aforesaid sharp reduction in the applied cutting force.

The primary object of the present invention, therefore, is to provide an improved cutting mechanism for cutting strip or sheet materials.

Another object of the present invention is to provide a simple and reliable cutting mechanism having a short stroke, relatively even power drain characteristics, and capable of producing relatively uniform cutting forces.

Other objects and advantages of the present invention will become readily apparent to those skilled in the art with the following description in reference to the accompanying drawings in which like characters denote like parts, and wherein.

Figure 3:
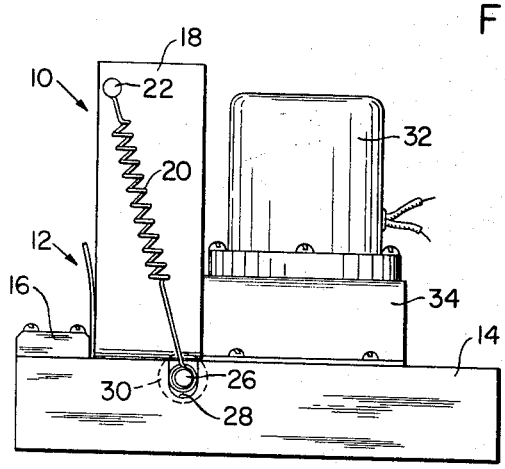
FIGURE 3 is an end view showing the general arrangement of a preferred embodiment of the cutting mechanism of the present invention.

For a better understanding of the invention, reference is first made to FIGURE 3 for a general description of the configuration of a preferred embodiment of the present invention.

The cutting mechanism, having a cutting cycle for cutting strip material, is indicated by arrow 10 and the strip material by arrow 12. Cutting mechanism 10 includes a support structure 14 and a path of travel for strip material 12. While cutting mechanism 10 can be used in any orientation, it is herein described with the cutting cycle taking place in a generally horizontal plane with the path of travel of strip material 12 arranged along a generally vertical plane such that the cut piece of strip material 12 emerges from cutting mechanism 10 vertically in front of the operator.

There is a first blade 16 mounted to support structure 14 on a first side of the path of travel of strip material 12. A second blade is mounted to support structure 14 on a second side of the path of travel of strip material 12. A crank drive mechanism is coupled to the second blade for rotating and driving the second blade through the cutting cycle. The crank drive mechanism is supported in a suitable housing 34 mounted on support structure 14. An electric motor 32 is mounted on housing 34 and drives the crank drive mechanism. The second blade, the crank drive mechanism, and the means for maintaining a constant cutting angle will be more fully described hereinafter.

Figure 1:
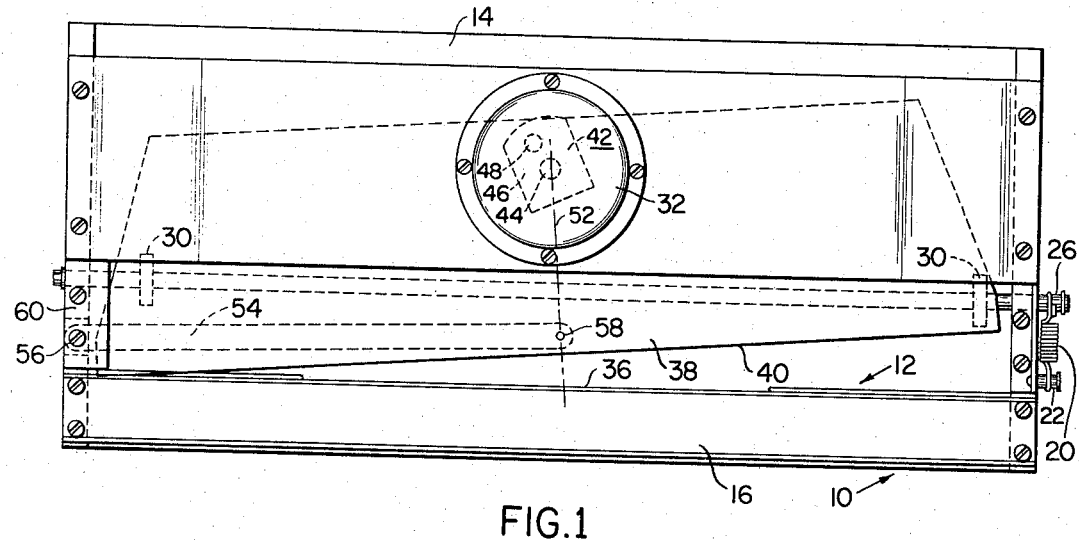
FIGURE 1 is a plan view showing a preferred embodiment of the cutting mechanism of the present invention.
Figure 2:
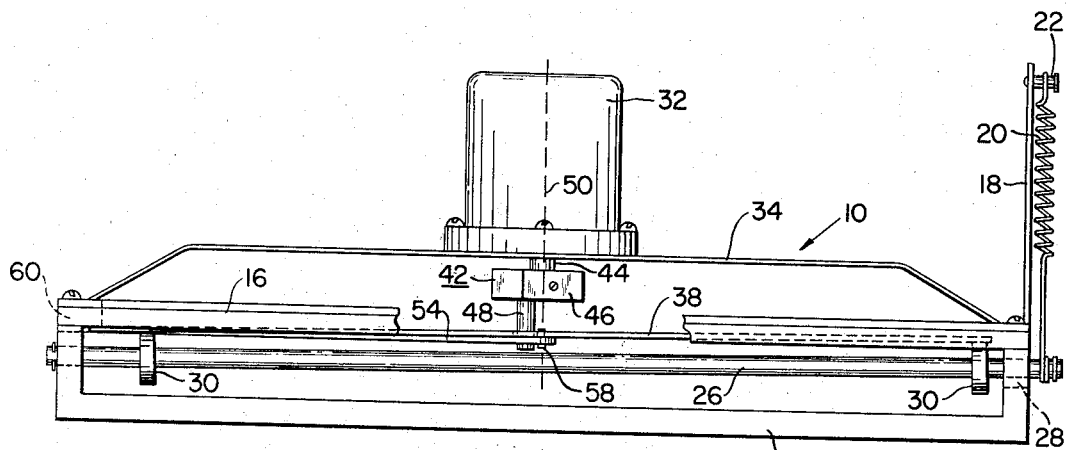
FIGURE 2 is a front view showing a preferred embodiment of the cutting mechanism of the present invention.

Referring now to FIGURE 1, taken in conjunction with FIGURE 2, there is shown the details of cutting mechanism 10. First blade 16, mounted to support structure 14, is positioned on one side of the path of strip material 12, and has a cutting edge 36. A second blade 38 has a cutting edge 40 and is supported within support structure 14. A crank mechanism shown generally by numeral 42, includes a crankshaft 44, a web 46 and a crankpin, 48. The extended longitudinal axis of rotation of crankshaft 44 is indicated as dashed line 50 in FIGURE 2 which intercepts second blade 38 along a straight line 52 which is shown in FIGURE 1 as a dash-dot line. Straight line 52 is substantially perpendicular to cutting edge 40. One end of crankshaft 44 is mounted to web 46. One end of crankpin 48 is mounted to web 46 and the other end is mounted to second blade 38.

As previously noted, electric motor 32 is provided for driving crank drive mechanism 42 and is coupled to crankshaft 44. Rotation of crank drive mechanism 42 causes second blade 38 to move through the cutting cycle; that is, second blade 38 is driven from the second side of the path to the first side of the path and back.

Means are provided for maintaining a cutting edge 40 at a substantially constant angle with respect to cutting edge 36 as second blade 38 is driven through the cutting cycle. A linkage bar is included, having one end pivotally mounted to support structure 14 by stud 56, and a second portion pivotally mounted to second blade 38 by pin 58, at a point on straight line 52.

Figure 4:
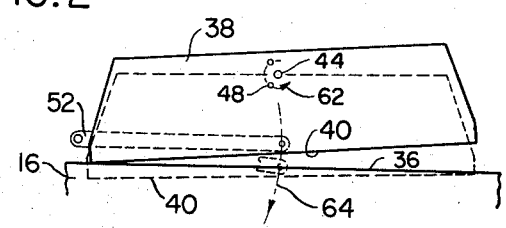
FIGURE 4 is a schematic illustrating knife travel.

Motor 32 drives crank drive mechanism 42 in the direction of arrow 62 of FIGURE 4. In the downstroke, crankpin 48 imparts a downward force on second blade 38, causing second blade 38 to cut the strip material and assume the position indicated in dotted lines. Without linkage member 54, second blade 38 would rotate in an eccentric manner with a constantly changing angle formed between cutting edge 36 and cutting edge 40. However, link bar 54 constrains the motion of second blade 38. Link bar 54, free to pivot about its mounting at support structure 14, moves through an arc shown by arrow 64 during the cutting stroke of second blade 38; that is, link bar 54 provides an additional constraining force on second blades 38. The vector sums of the constraining force and the downward forces react to impart a rocking like motion to second blade 38. However, the angle formed by cutting edge 36 and cutting edge 40 is maintained substantially constant during cutting to produce the advantages discussed hereinabove. Also, since the crankshaft directly drives the movable blade at a central portion thereof, the aforesaid cutting force variations are sharply reduced and the indirect longitudinal drive linkages of prior art are eliminated.

Biasing means for biasing the second blade against the first blade to obtain a good cutting action includes an axle 26 bearing guide wheels 30. Biasing spring 20 is coupled at one end, for example, by a stud 22 to an upright frame 18 which in turn is mounted to support structure 14. The other end of spring 20 is coupled to one end of axle 26. Axle 26 rides in a slot 28 machined in support structure 14. Spring 20 is oriented to press guide wheels 30 against second blade 38.

Means are provided for guiding second blade 38 adjacent but to one side of first blade 16 at the beginning of the cutting cycle. Plate 60 is mounted to support structure 14 to guide blade 38 adjacent to fixed blade 16 at the beginning of cutting.

With particular reference to FIGURE 2, it is to be observed that axle 26 is so disposed that its longitudinal axis is not parallel to the plane of second blade 38, but rather is disposed at an angle. The result is to maintain cutting edge 12 and cutting edge 40 in pressure contact during the cutting cycle to achieve the proper shear effect without providing an additional flange member 18 at the left-hand end of the cutter with an additional spring corresponding to spring 20, all of which would be required in the absence of this feature.

While there has been presented what is at present considered to be the preferred embodiment of the invention, it will be apparent to those of ordinary skill in the art that many and various changes and modifications may be made with respect to the embodiment described and illustrated without departing from the spirit of the invention. It will be understood, therefore, that all changes and modifications as fall fairly within the scope of the present invention, as defined in the appended claims, are to be described as a part of the present invention.

What is claimed is:
1. A cutting mechanism having a cutting cycle for cutting strip material, comprising in combination:
 (a) a support structure, including a path for strip material;
 (b) a first blade mounted to said support structure on a first side of said path, said first blade having a cutting edge;
 (c) a second blade mounted to said support structure on a second side of said path, said second having a cutting edge;
 (d) a crank drive mechanism, including a crankshaft, coupled to said second blade for rotating and driving said second blade through said cutting cycle; and
 (e) a linkage mechanism having one portion pivotally mounted to said support structure and a second portion pivotally mounted to said second blade at a point in the vicinity of a straight line perpendicular to said cutting edge and passing through the extended longitudinal axis of rotation of said crankshaft.

2. The cutting mechanism of claim 1, wherein said said first blade is a fixed blade.

3. The cutting mechanism of claim 1, further comprising:
 means for guiding said second blade adjacent said first blade.

4. The cutting mechanism of claim 1, further comprising:
 means for biasing said second blade against said first blade.

5. The cutting mechanism of claim 4, wherein said means for biasing includes an axle having at least one guide wheel and a housing spring coupled between one portion of said axle and said support structure and oriented to press said guide wheel against said second blade.

References Cited
UNITED STATES PATENTS

| | | | |
|---|---|---|---|
| 950,099 | 2/1910 | Fischer | 83—912 |
| 2,870,837 | 1/1959 | Rosenberg | 83—602 X |
| 2,843,203 | 7/1958 | Young | 83—646 X |

FOREIGN PATENTS

| | | |
|---|---|---|
| 351,262 | 6/1931 | Great Britain. |

ANDREW R. JUHASZ, *Primary Examiner.*